Patented Aug. 5, 1952

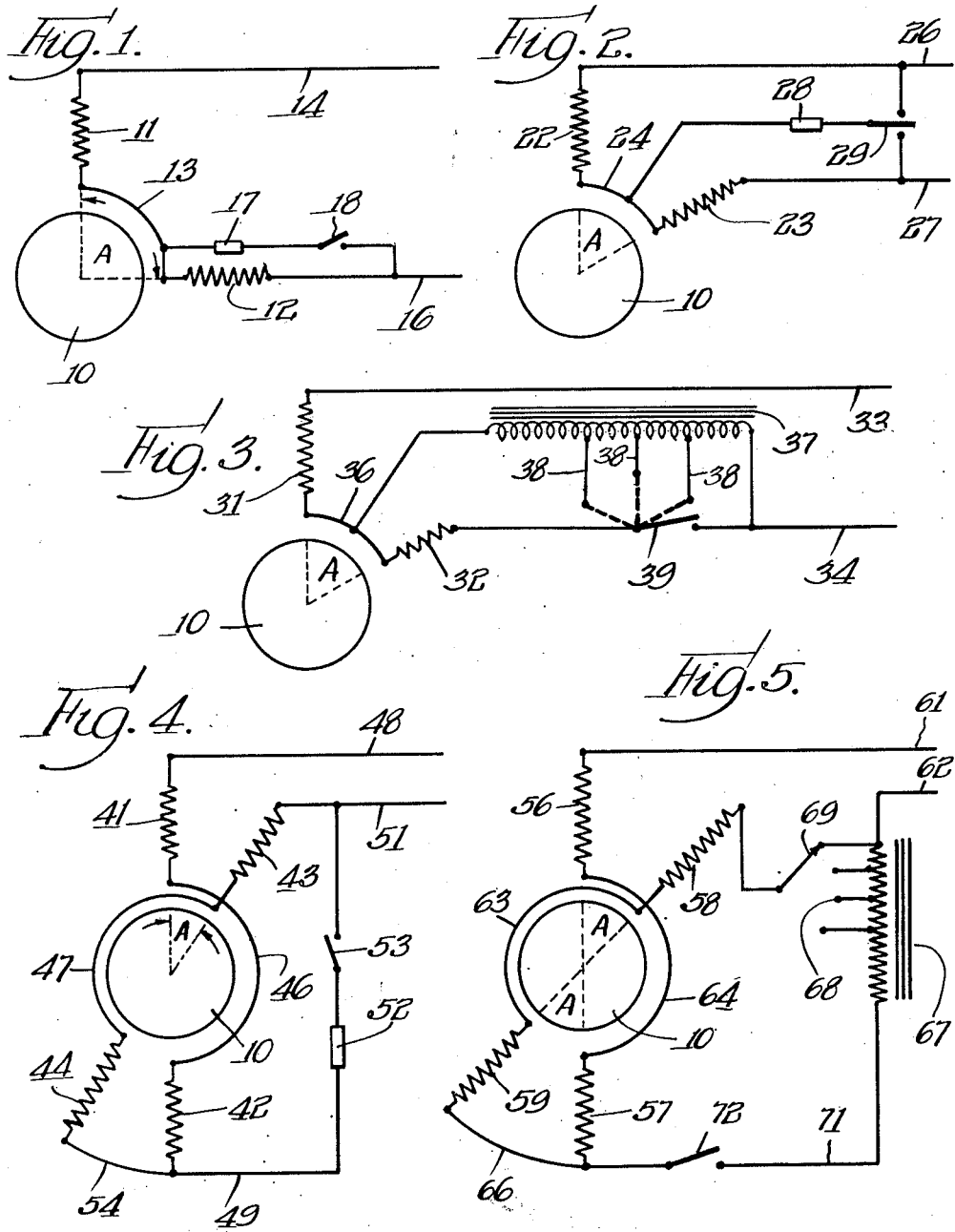

2,606,311

UNITED STATES PATENT OFFICE 2,606,311

SINGLE PHASE INDUCTION MOTOR

Kurt Burian, Chicago, Ill., assignor to G-M Laboratories, Inc., Chicago, Ill., a corporation of Illinois Application June 30, 1949, Serial No. 102,419

4 Claims. (Cl. 318—220)

My invention relates to single phase induction motors.

The usual single phase induction motor consists of a stator and a rotor carrying a short circuited winding. The stator carries two windings or sets of windings, namely, a main winding or windings connected in series directly to the single phase line and an auxiliary winding or windings also directly connected to the single phase line and, therefore, in parallel relation to the main windings. The auxiliary windings are usually displaced in space by an angle of 90 electrical degrees from the main windings and generally are provided with an external impedance connected in series to modify the phase relation as contrasted with the main windings. Such motors are started with both the main and auxiliary windings energized and, after the motor is brought up to speed, the auxiliary windings are usually disconnected by suitable means.

Some motors are constructed in which the auxiliary winding may remain connected to the line but in such motors the auxiliary winding contributes less than normal to the starting operation of the motor. Moreover, when a motor is so designed that the auxiliary winding can be left connected, it is essential that the external impedance be designed for running operation and the result is usually relatively low starting torque or at least starting performance of a poorer order than is obtainable if the auxiliary windings are disconnected.

When the usual single phase induction motor of the prior art is required to be operated at variable speeds, the usual practice is to introduce a tapped reactor which is placed in series with the motor and which has the effect of decreasing the speed which the motor would have if the reactor were not employed. It is known that this arrangement is not very satisfactory because the result is reduced starting torque at the lower speed settings, and frequently motors connected in this fashion fail completely to start at low speed and under load, so that the windings are burned out as a result.

The principal object of my invention is the provision of an improved single phase induction motor.

Another object is the provision of an improved single phase induction motor in which both the main and auxiliary windings are used for both starting and running.

A further object of my invention is the provision of a simple improved single phase induction motor which can be operated in either direction by simple control means.

A still further object is the provision of a simple inexpensive induction motor which may readily be operated at variable speeds without the objectionable limitations of variable speed motors of the prior art.

Other objects and features of the invention will be brought out in the following detailed description taken with the accompanying drawings, wherein:

Fig. 1 is a schematic diagram of a motor built according to the present invention;

Fig. 2 is a schematic diagram of the same type of motor modified for operation in either direction;

Fig. 3 is a schematic diagram of a motor built according to the present invention but adapted for variable speed operation;

Fig. 4 is a schematic diagram of a motor substantially the same as Fig. 1 but showing the manner in which the circuit is arranged when more than a single winding is used, such as is common in usual practice; and Fig. 5 is a schematic diagram of a motor having variable speed characteristics and in which the impedance used for varying the speed may be cut out entirely.

Referring now first to Fig. 1, which comprises the simplest embodiment of my invention, I show schematically a rotor 10 and a stator comprising a main winding 11 and auxiliary winding 12 displaced from each other by an angle A subtended for purposes of analysis by dotted lines coincident with axes of the windings 11 and 12 and shown in the drawings to comprise approximately 90 electrical degrees. The windings 11 and 12 are connected in series through a conductor 13 to the main supply lines 14 and 16; and impedance 17 is connected to the conductor 13 and to the supply line 16 so as to parallel winding 12. A switch device 18 is provided for disconnecting the impedance 17 when and as desired.

Before referring to other forms of the invention, as shown in the remaining figures, I wish to explain further the significance of the structure shown in Fig. 1 and analyze its characteristics, advantages, and functions as contrasted with conventional single phase induction motors of the kind discussed above.

Assuming the windings 11 and 12 to be wound of the same size wire with the same number of turns and that the angle A is 90 electrical degrees, the motor of Fig. 1 is readily started with adequate torque and can be operated efficiently after being brought up to speed by disconnecting the impedance 17 by means of the switch device 18. In this respect I have one radical departure from accepted theory in that I have found the generally accepted principle with respect to magnetic fields of this type not to be true. In other words, while it has been generally assumed that magnetic fields set up by two windings oppose each other and, therefore, that their use would result in impaired performance, the assumption is by no means correct. I have found that the fields of two such windings add to or aid each other and that the result is to set up a magnetic field which is the resultant of the two fields and is located in space between the main and auxiliary windings. When the main and auxiliary windings are identical, this resultant field is located in space half-way between the two windings; but when the windings are not identical, as discussed hereinbelow, the exact location of the resultant field may vary but it will still be at a point between the two windings.

Making a further comparison between the motor of my invention and the conventional split phase motor, it may be noted that in order to set up a magnetic field of the same magnitude in a motor built according to the present invention as the magnitude of the conventional motor, each of the windings 11 and 12 of the motor of Fig. 1 should be wound with approximately 70 per cent of the number of turns used in the main winding of the conventional motor. Those skilled in the art will understand that in making the present comparison I am assuming motors of the same general size utilizing the same physical parts, that is to say, the same rotor and the same frame for supporting the stator windings. Under the conditions postulated, the total weight of copper wire used in the main and auxiliary windings 11 and 12, respectively, is about 140 per cent of the weight of copper in the main winding of the conventional motor. Since the postulated conventional motor is required to have an auxiliary winding containing about 60 per cent of the copper used in the main winding, it follows that the total weight of copper in the conventional motor is 160 per cent of the weight of copper in the main winding. Assuming, therefore, approximately the same motor performance, a motor built according to the present invention will require at least 13 per cent less copper in the windings 11 and 12 than is used in the main and auxiliary windings of the conventional motor.

A further advantage of the motor of my invention results from this same fact that a smaller number of turns of copper wire are necessary to secure the same performance. Because of the smaller number of turns in each winding (assuming wire of the same size as in the conventional motor), each slot in the stator is filled to a lesser extent and this fact permits easier and faster assembly of the coils into the stator. In the production of motors, a very considerable saving in cost and greatly facilitated production are obtained, due to this fact alone.

Using the same frame, I am able to increase the output of a motor built according to my invention to a very considerable extent by merely increasing the gauge of copper wire used and filling up all of the slot space available while reducing the number of turns in the main and auxiliary windings, and, of course, still employing a smaller number of turns than in the main winding of the conventional motor. When using wire of heavier gauge in this manner, one is permitted to increase the full load current for the same current density and obtaining greater output while retaining substantially the same efficiency as the conventional motor. To recapitulate, if an assumption is made that the windings 11 and 12 in the motor of my invention are 90 electrical degrees apart and have less than 70 per cent of the number of turns used in the main winding of a given conventional split phase induction motor of the prior art, I am able without increasing the frame size and without appreciably increasing the temperature of the motor under load, to increase markedly the output of such a motor by merely increasing the diameter of the copper wire used in the windings sufficiently to fill the available slot space.

The motor of my invention can be still further improved and still much greater benefits obtained if the angle A is something other than 90 degrees and if the windings 11 and 12 are not identical. Those skilled in the art will understand that the particular specific advantage or benefit obtained in any given case will depend upon motor design and the performance characteristics desired. The motor of the present invention permits utilization of usual design principles without departing from the significant novelty disclosed. I have calculated mathematically and analyzed by test characteristics of motors of different specific designs all utilizing the features of my invention and I have found some very interesting and startling characteristics to exist. I have found, for example, that for optimum starting performance, the ratio of the effective number of turns used in the auxiliary winding 12 to the number of turns used in the main winding 11 should not be smaller than about 1.3. Stated in another way, the effective number of turns in the auxiliary winding should be at least about 30 per cent greater than the effective number of turns in the main winding. For optimum running performance (assuming that the impedance 17 is disconnected when the motor has come up to speed), the ratio $a$ of the effective number of turns of winding 12 to winding 11 and the space angle A should satisfy the following equation:

$$a^2 + 2a \cos A + 1 = \frac{\text{Num}}{\text{Den}}$$

$$\text{Num} = |(Z_{1M} + Z_{1S})[(Z_2 + Z_M)^2 + S^2(X_2 - jZ_M)^2]|$$

$$\text{Den} = |Z_M[Z_2^2 + Z_2 Z_M + S^2(X_2 - jZ_M)^2]|$$

Where $a$ = ratio of effective number of turns in winding 12 to that in winding 11

$A$ = space angle in electrical degrees between windings 11 and 12

$Z_{1M}$ = local impedance of winding 11

$Z_{1S}$ = local impedance of winding 12

$X_2$ = self reactance of rotor referred to winding 11

$Z_2$ = rotor impedance referred to winding 11

$Z_M$ = magnetizing impedance referred to winding 11

$S$ = ratio of motor speed at which the optimum torque is required, to synchronous speed $j = \sqrt{1}$ $| \, |$ indicate absolute value of vector quantity enclosed It is, of course, obvious that a solution for $a$ in the equation given is impossible in the abstract, but I wish to point out that in almost all instances the optimum running performance requires the auxiliary winding to contain a larger amount of copper and a larger number of effective turns than the main winding, thus distinguishing markedly from the conventional motor of the prior art, in which the auxiliary winding almost always has less weight of copper than the main winding. Looking further to the equation, it will be remembered that the angle in space between the main and auxiliary windings is a factor in determining the relative number of turns in the two windings. I have found that the angle A should be between 30 and 90 electrical degrees for optimum running performance with some definite advantage if only running performance is taken into consideration, if such angle is maintained between about 30 and 45 electrical degrees. To increase starting torque, there is an advantage in increasing the angle A and there may even be an advantage in starting, with some loss in running characteristics, if the angle A is somewhat over 90 electrical degrees. While my invention permits the utilization of an angle A less than 30 degrees—and the use of an angle A less than 30 degrees may be desirable for a given purpose—I prefer for general all-around performance to maintain the angle A at somewhat between 30 and 90 degrees. When the angle A is more than 30 electrical degrees, I prefer, in general, to employ at least as much copper in the auxiliary winding as in the main winding. Assuming the same size wire (which, of course, need not be the case), the number of effective turns in the auxiliary winding would, therefore, at least be equal to the number of effective turns in the main winding.

Fig. 2 shows an electric motor generally similar to Fig. 1 but capable of operation in either direction. The motor of Fig. 2 has a rotor 10, a main winding 22, an auxiliary winding 23, with the two windings connected to each other by a conductor 24 and in series to single phase supply lines 26 and 27. An impedance 28 is connected at one terminal to the conductor 24 and at the opposite terminal to a switch device 29 for connection to either supply line 26 or 27. The impedance 28 may, therefore, be connected in parallel relation to either the main winding 22 or the auxiliary winding 23. I have referred to the windings 22 and 23 as main and auxiliary windings, respectively, but it will be understood that if the motor is to have identical running characteristics in both directions, the windings 22 and 23 will be identical and either may function as the main or auxiliary winding, depending upon the direction of rotation. On the other hand, if optimum performance is desired in one direction and inefficient performance in the opposite direction is adequate for an intended purpose, the windings may be so designed as to favor optimum performance in the prevalent direction in which the motor is operated.

The manner in which the motor of Fig. 2 is operated is obvious, due to the schematic nature of the showing. If the switch element 29 is moved to down position, the motor will start in one direction, which we may assume is in a clockwise direction looking at Fig. 2. If the switch is left in down position or if it is returned to neutral position, the motor continues to run in the original direction. If the switch is moved to upper position, however, dynamic braking of the motor takes place and as soon as the motor has finally slowed down and stopped completely, it starts in the opposite direction. By means of my design, therefore, it is not only possible by very simple means to produce a reversible motor but also to produce one in which dynamic braking can be utilized.

In discussing Figs. 1 and 2, I refer to the members 17 and 28, respectively, as impedances without particular discussion as to the kind of impedance which may be used. While there may be instances, as will appear hereinbelow, in which a particular type of impedance may be desired, it should be understood that my invention permits the use of any type of impedance which is known in the industry and commonly or uncommonly used to split the phase between two windings for starting and like purposes. I may, for example, use a resistor, capacitor, reactor, or combination thereof.

Fig. 3 is a schematic diagram of a motor which employs a particular type of impedance for variable speed operation. In Fig. 3 I employ the conventional rotor 10 with a main winding 31 and auxiliary winding 32 connected in series to the single phase power lines 33 and 34 through connecting conductor 36. A reactor 37 is connected at one terminal to the supply line 34 and at the other to the connecting conductor 36. The reactor is, therefore, in parallel relation to the auxiliary winding 32. The reactor is provided with as many taps 38 as desired and a multiposition single pole switch 39 is provided to select the particular desired speed setting, depending upon the particular contact which it engages. Thus the same reactor is used for full speed operation or for reduced speed operation and no additional device or mechanism is required for speed reduction. Because of the arrangement shown, the starting torque remains essentially constant regardless of the speed setting. A further important advantage can be obtained by the introduction of an air gap into the magnetic circuit of the reactor. Such gaps are frequently used in reactors used for power supply units and are so conventional that a specific showing thereof is not essential to an understanding of the present invention. When such an air gap is used, a decreased supply voltage will effect the reactance of the reactor to a much lesser extent than if the magnetic circuit were continuous. Thus, starting a motor with a reactor in parallel to winding 32 can be successfully accomplished even if the supply voltage is below its normal value.

In Figs. 4 and 5, I show somewhat more in detail the manner of applying the principles of my invention to practical motor design. Looking first to Fig. 4, I employ the usual rotor 10 and a stator comprising main windings 41 and 42 and auxiliary windings 43 and 44. The main windings 41 and 42 are connected by a conductor 46 and the auxiliary windings 43 and 44 are interconnected by conductor 47. One terminal of conductor 41 is connected to a supply line 48. A conductor 49 is connected to supply line 51, an impedance 52 and switch 53 being inserted in the conductor 49. Windings 42 and 44 are connected at their outer terminals by a conductor 54. It will thus be seen that a circuit is established in which windings 41, 42, 43 and 44 are connected in series to the supply lines 48 and 51 and in which the impedance 52 is connected in parallel relation to the auxiliary windings 43 and 44 when switch 53 is closed. Since the windings 41 and 42 are of opposite polarity and positioned 180 electrical degrees apart, they may be considered as one winding and the same is true with respect to the auxiliary windings 43 and 44. As a result of this arrangement, the statements made with respect to Fig. 1 may be made with the same force and literally with respect to Fig. 4. The angle A is shown as comprising somewhat less than 45 degrees, being thus within the preferred range discussed hereinabove, but it will be understood that this angle could, without departing from the present invention, be of the order of 90 electrical degrees. It will be noted that even though the coils 41 and 43 are not directly connected electrically in the same manner as the windings 11 and 12 of Fig. 1, they functionally occupy the exact positions as the windings 11 and 12. Thus, the starting and running characteristics of a motor constructed in accordance with Fig. 4 may be exactly the same as described in connection with Fig. 1. The impedance 52, moreover, can occupy the same functional relation to the main and auxiliary windings as described in connection with Fig. 2, so that the motor of Fig. 4 could readily be made to reverse in the same manner as the motor of Fig. 2.

Looking at Fig. 5, the rotor 10 may be conventional as in the case of the other figures and the main windings 56 and 57 and auxiliary windings 58 and 59 occupy the same general relationship to the supply lines 61 and 62 and conductors 63, 64 and 66 as in the embodiment of Fig. 4. In this form of the invention, however, I provide a reactor 67 with a number of taps 68 which may be connected into or out of the circuit by means of a switch device 69 connected to one side of auxiliary winding 58. The conductor 71 which extends from one side of the reactor to the main winding 57 also has a switch device 72. In operating a motor constructed in accordance with Fig. 5, the switch device 69 may be adjusted to operate the motor at variable speeds and the reactor is capable of functioning to provide starting torque so long as the switch device 72 is closed. When the motor has been started, however, the switch 72 may be opened and the motor run without the reactor, it being noted that if the switch device 69 is in the uppermost position shown in Fig. 5, the reactor is cut out entirely and the windings 56, 57, 58 and 59 are connected in series with the main suply lines 61 and 62.

It is obvious that motors constructed in accordance with principles of my invention may be operated with or without impedance in parallel with one of the windings. In general, better running characteristics are obtained if the impedance is disconnected, although in the case of motors which are intended for only intermittent use, it may be satisfactory to leave the impedance permanently connected, in which case the switch device would be eliminated entirely. A motor which has the impedance permanently connected in parallel to one of the windings may still employ to advantage other specific characteristics and features discussed hereinabove, such, for example, as the relationship established by the equation given hereinabove.

The principal function of the impedance is to facilitate starting and in this connection it should be borne in mind that the impedance may be left out entirely and some other starting means employed, and a very great advantage obtained by relating the main and auxiliary windings to each other in the manner discussed. While many different types of impedances may be used, there is no objection to, and at times a very definite advantage in, employing an impedance which definitely shunts the winding with which it is associated. Such impedance may comprise, for example, a choke coil, reactor, resistance, or the like. I wish also to point out that the switch device, such as at 18, 29, 39, 53, 69 or 72, may be so arranged as to substitute one type of impedance for another, or one electrical value for another. An example is an impedance specially designed for starting and another impedance particularly designed for the running characteristics desired, with a switch device either manually or automatically controlled to connect either in parallel with the auxiliary winding.

I have described my invention in detail for the benefit of those skilled in the art but the scope is defined by the appended claims.

I claim:

1. In a single phase induction motor adapted to be connected across a single phase line, a stator comprising a main winding and an auxiliary winding having one end of each connected together for connecting the windings in series and with the other end of the main winding adapted for connection with one of the lines, a reactor having a coil having one end connected to the juncture of the main and auxiliary windings and having the other end adapted for connection with the other of the lines, taps connected to turns of said coil, and switch means connected to the other end of the auxiliary winding and selectively engaging said taps inversely to vary the number of turns of the reactor coil in parallel with the auxiliary winding and in series with the main and auxiliary windings.

2. In a single phase induction motor adapted to be connected across a single phase line, a stator comprising a main winding and an auxiliary winding connected in series, reactor means connected in parallel with the auxiliary winding, reactor means connected in series with the main and auxiliary windings, and regulating means for the reactor means for inversely varying the reactance in parallel with the auxiliary winding and in series with the main and auxiliary windings.

3. In a single phase induction motor adapted to be connected across a single phase line, a stator comprising a main winding and an auxiliary winding having one end of each connected together for connecting the windings in series and with the other end of the main winding adapted for connection with one of the lines, a reactor having a coil having one end connected to the juncture of the main and auxiliary windings and having the other end adapted for connection with the other of the lines, taps connected to turns of said coil, switch means connected to the other end of the auxiliary winding and selectively engaging said taps inversely to vary the number of turns of the reactor coil in parallel with the auxiliary winding and in series with the main and auxiliary windings, and a switch between the juncture of the main and auxiliary windings and the reactor coil for disconnecting the portion of the reactor coil in parallel with the auxiliary winding.

4. In a single phase induction motor adapted to be connected across a single phase line, a stator comprising a main winding and an auxiliary winding connected in series, reactor means connected in parallel with the auxiliary winding, reactor means connected in series with the main and auxiliary windings, regulating means for the reactor means for inversely varying the reactance in parallel with the auxiliary winding and in series with the main and auxiliary windings, and means for interrupting the parallel connection between the reactor means and the auxiliary winding.

KURT BURIAN.

REFERENCES CITED

The following references are of record in the file of this patent:

UNITED STATES PATENTS

| Number | Name | Date |
|---|---|---|
| 471,155 | Thomson | Mar. 22, 1892 |
| 620,965 | Rice et al. | Mar. 14, 1899 |
| 848,925 | Schattner | Apr. 2, 1902 |
| 1,024,635 | Kunkel | Apr. 30, 1912 |
| 1,050,444 | Fynn | Jan. 14, 1913 |
| 1,928,108 | Marvel | Sept. 26, 1933 |
| 2,120,321 | Bargdill | June 14, 1938 |
| 2,454,968 | Fuge | Nov. 30, 1948 |